United States Patent [19]

Hesselbart et al.

[11] 4,396,813

[45] Aug. 2, 1983

[54] ENCLOSED CIRCUIT INTERRUPTER OF THE DRAWOUT TYPE HAVING A POSITION ACTUATED DRIVE CLUTCH ON THE DRIVE MEANS

[75] Inventors: Glenn A. Hesselbart, Wilkins Township, Allegheny County; Robert E. Wobrak, North Huntingdon, both of Pa.

[73] Assignee: Westinghouse Electric Corp., Pittsburgh, Pa.

[21] Appl. No.: 327,157

[22] Filed: Dec. 3, 1981

[51] Int. Cl.³ .............................................. H01H 9/00
[52] U.S. Cl. ................................. 200/50 AA; 361/33; 361/141; 361/143
[58] Field of Search ...................... 200/50 AA, 14, 47; 192/141, 143; 361/336, 337, 338, 339

[56] References Cited

U.S. PATENT DOCUMENTS 3,440,371  4/1969  Netzel et al. ................... 200/50 AA
3,593,829  7/1971  Williams ............................... 192/141

*Primary Examiner*—A. T. Grimley
*Assistant Examiner*—Morris Ginsburg
*Attorney, Agent, or Firm*—J. P. Hillman

[57] ABSTRACT

Circuit interrupter switchgear including a drawout unit mounted within an enclosure and operable between engaged and disengaged positions by means of a drive means having a two-way position actuated drive clutch. The position actuated drive clutch has an engaging means that is responsive to a sensing means for selectively engaging and disengaging a torque source with the drive means according to predetermined positions of the drawout unit.

15 Claims, 15 Drawing Figures

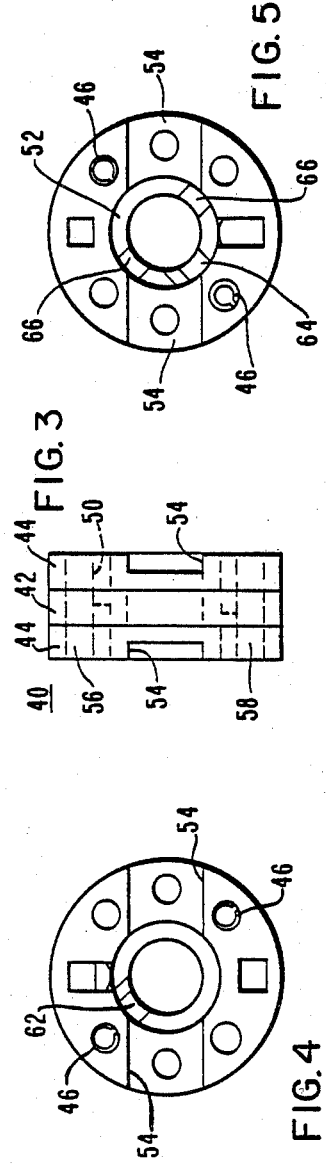
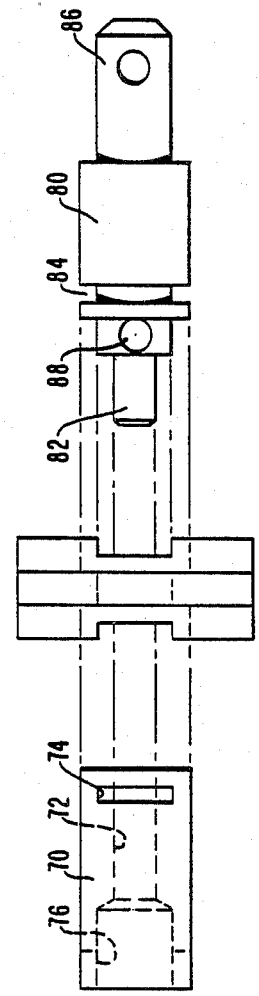
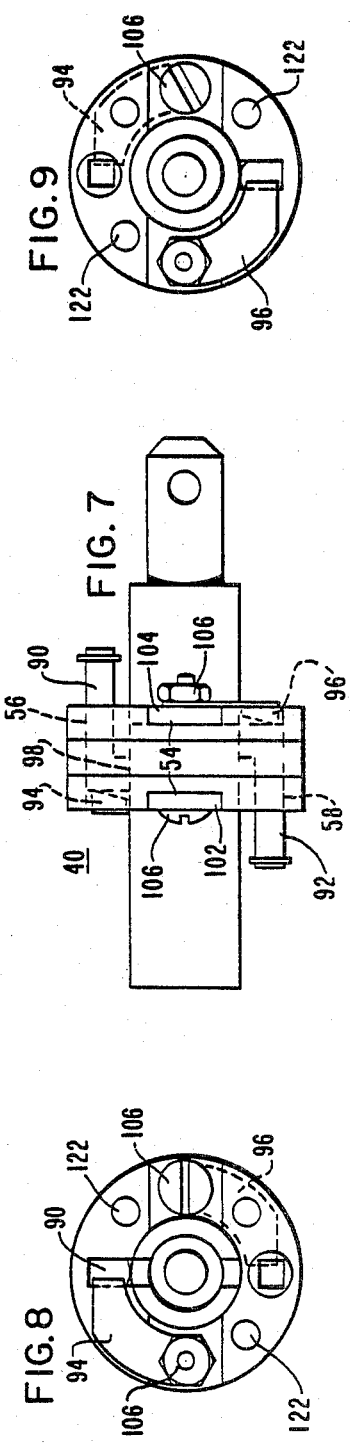

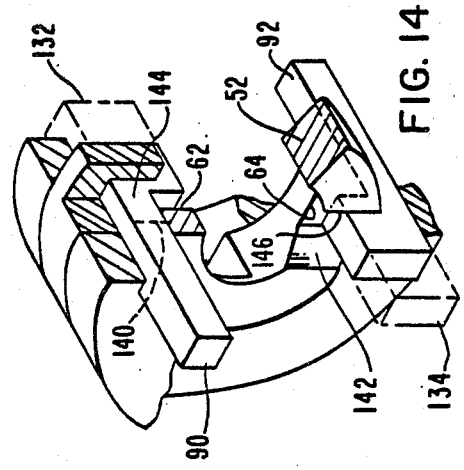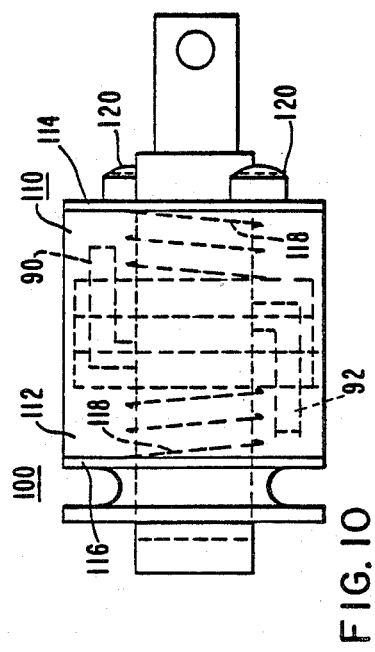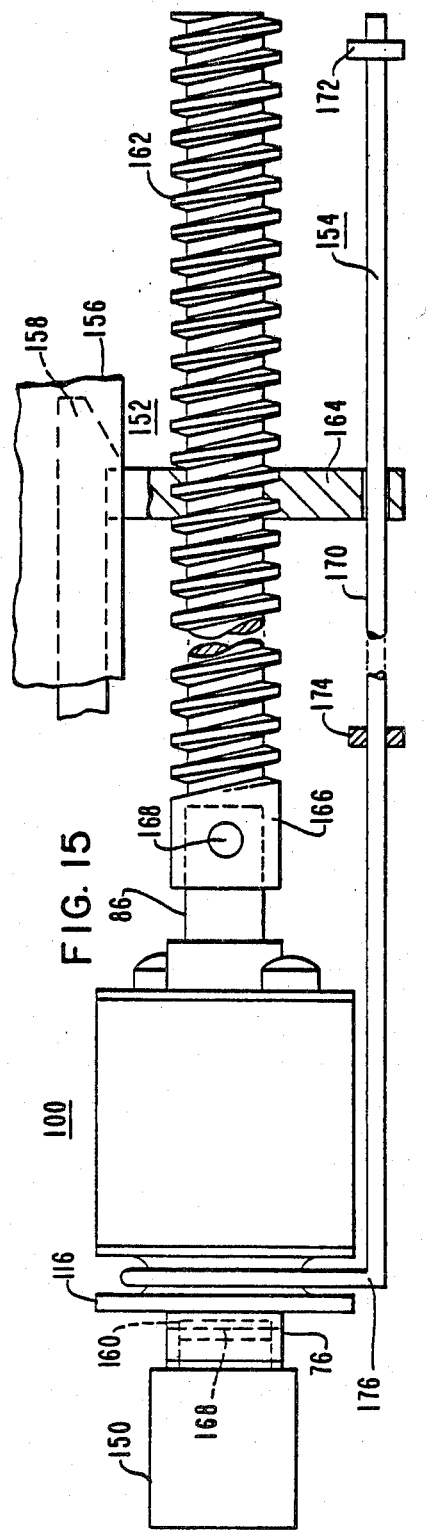

ENCLOSED CIRCUIT INTERRUPTER OF THE DRAWOUT TYPE HAVING A POSITION ACTUATED DRIVE CLUTCH ON THE DRIVE MEANS

BACKGROUND OF THE INVENTION

1. Field of the Invention

The invention relates generally to enclosed switchgear and more particularly enclosed switchgear having removable drawout circuit breaker units.

2. Description of the Prior Art

Circuit interrupters having one or more drawout units mounted within an enclosure are operable between engaged and disengaged positions. Maintenance procedures are performed after rolling out the circuit breaker to disconnect it from the source of high voltage. The high voltages carried by the apparatus can produce injury to maintenance personnel and damage to the equipment if the circuit breaker is not positively located at both the connect or engaged and the disconnect or disengaged positions. For example if the high potential is reapplied to the switchgear when the circuit breaker has a poor connection at the engaged position, the resultant arcing would cause such intense heat as to cause damage to the switchgear apparatus, sometimes with explosive force, endangering personnel proximate the switchgear enclosure. Accordingly it is necessary that the drive means for moving the drawout unit between the engaged and disengaged position, have the ability to positively position the drawout unit at both the engaged and disengaged positions. This ability is necessary whether the drive means be a hand cranked mechanical mode or electrical motor operated optional mode for remote operation used for a hazardous or explosive environment. The most common method employed in the prior art for attaining this positive position was to operate the drive means whether by hand or electrical motor until the drive means "bottomed out" that is ceased to operate at each end of the drawout unit's free travel. This meant for the hand cranked mechanical drive means mode the operator would turn the crank until he met a large resistance. With the electrical motor operated drive mode the operator would energize the motor until the motor is stopped at the end of the free travel. The disadvantage of course in such a positioning scheme is that it would be difficult for the operator to determine whether the circuit breaker was indeed at the end of the free travel or if it had bound up on something lying in the travel path. Complicating the operator's determination is the fact that a rather large amount of resistance force is necessary to overcome the resilient fingers when the contact clusters initially encounter the fixed conductor stabs of the cabinet, after which the drawout unit must be driven further against lower resistance to be in the fully engaged position wherein maximum contact of the cluster/stab arrangement is attained. A friction or torque operated clutch placed in the drive means is an unsatisfactory solution to the above problems for the same reasons that the "bottomed out" approach is unsatisfactory, i.e. the variations in torque encountered along the travel path of the drawout unit and the possible binding of the travel mechanism render a friction or torque operated clutch an imprecise method of determining the engaged and disengaged positions. Accordingly it would be desirable to incorporate an isolatable position actuated drive clutch on the drive means for a circuit interrupter drawout unit so that it may be located in the low voltage area of the switchgear.

SUMMARY OF THE INVENTION

Circuit interrupter type switchgear including a drawout unit mounted within an enclosure and operable between engaged and disengaged positions by use of a driving means having an isolatable positioning means for positive positioning of the drawout unit in both the engaged and disengaged positions. The positioning means includes a position actuated drive clutch adapted for insertion between a torque source and a rotatable shaft for selectively engaging and disengaging the torque source with the rotatable shaft according to predetermined positions of the drawout unit. The position actuated clutch of the invention includes a clutch body having first and second key ways disposed therein, first and second clutch pawls disposed within the first and second key ways, a drive collar, sensing means for sensing the position of the drawout unit, and engagement means responsive to the sensing means for selectively engaging and disengaging each of the first and second clutch pawls with the drive collar to selectively provide and remove a rigid connection between the clutch body and the drive collar to selectively transmit and interrupt torque to the rotatable shaft in either direction of rotation.

BRIEF DESCRIPTION OF THE DRAWINGS

The invention may be understood and further advantages and uses thereof more readily apparent, when considered in view of the following detailed description of the exemplary embodiments, taken with the accompanying drawings in which:

FIG. 3 is an assembly drawing of a portion of the position operated clutch according to the teachings of the invention;

FIG. 4 is a side view of the clutch portion shown in FIG. 3;

FIG. 5 is the opposite side view of the clutch portion shown in FIG. 3;

FIG. 6 is an exploded assembly view of parts of the clutch according to the teachings of the invention illustrating the input shaft, output shaft and their positions relative to the clutch body;

FIG. 7 is another assembly view showing additional parts of the clutch according to the teachings of the invention;

FIG. 8 is a side view of the clutch parts illustrated in FIG. 7;

FIG. 9 is the opposite side view of the clutch parts illustrated in FIG. 7;

FIG. 10 is an elevational view of the assembled clutch according to the teachings of the invention;

FIG. 14 is an orthogonal view of the clutch drive collar and the clutch pawls showing the relationship between the drive pawls and the drive collar when each of the clutch pawls are engaged and disengaged; and FIG. 15 is a schematic view of the arrangement of the position actuated clutch of the invention in combination with a torque source and a drive means illustrating a sensing means for sensing when the drawout unit is in both the disengaged and the engaged positions.

DESCRIPTION OF THE PREFERRED EMBODIMENT

Figure 1:
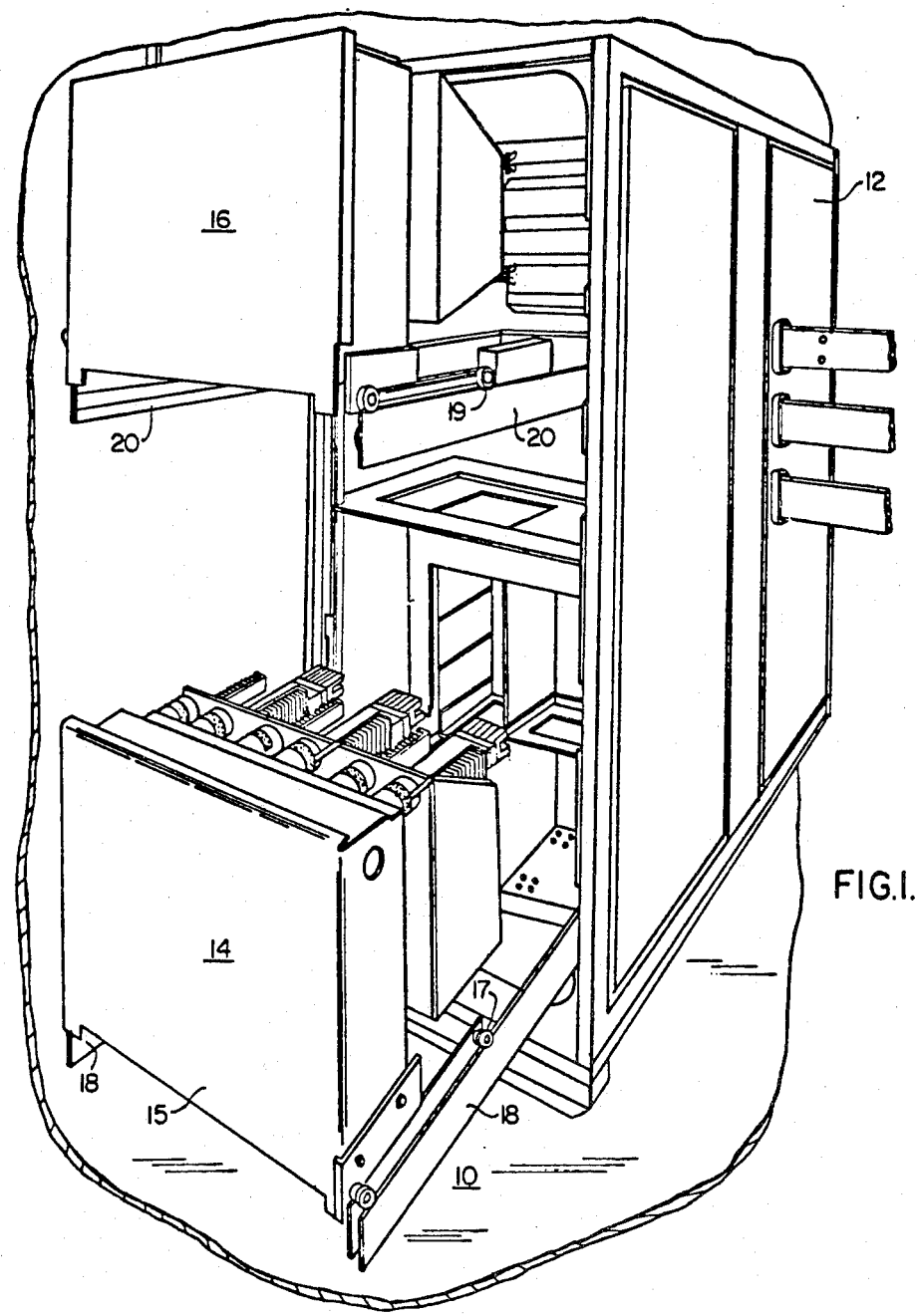
FIG. 1 shows an orthogonal front and side view of a metal enclosed circuit breaker system according to the teachings of the invention, with the drawout circuit breaker units shown rolled out on rails from the enclosure.

Throughout the drawings, like elements will be identified with like reference numerals. Referring now to the drawings, and to FIG. 1 in particular, there is shown a metal clad or metal enclosed switchgear station 10 constructed according to the teachings of the invention. In particular, switchgear station 10 includes a metal cabinet or enclosure 12 having tandemly, vertically disposed therein three-phase vacuum circuit interrupter drawout units 14 and 16 respectively. The lower circuit interrupter drawout unit 14 is movably disposed by way of wheels 17 on rails 18 for moving the circuit breaker apparatus 14 into and out of electrical contact with high voltage terminals (not shown) disposed in the rear of the cabinet 12. Likewise, the upper circuit interrupter drawout unit 16 as shown in FIG. 1 is movably disposed by way of wheels 19 on rails 20 for moving the upper circuit interrupter apparatus into and out of electrical contact with terminals 22 (FIG. 2) in the rear of metal cabinet 12.

Figure 2:
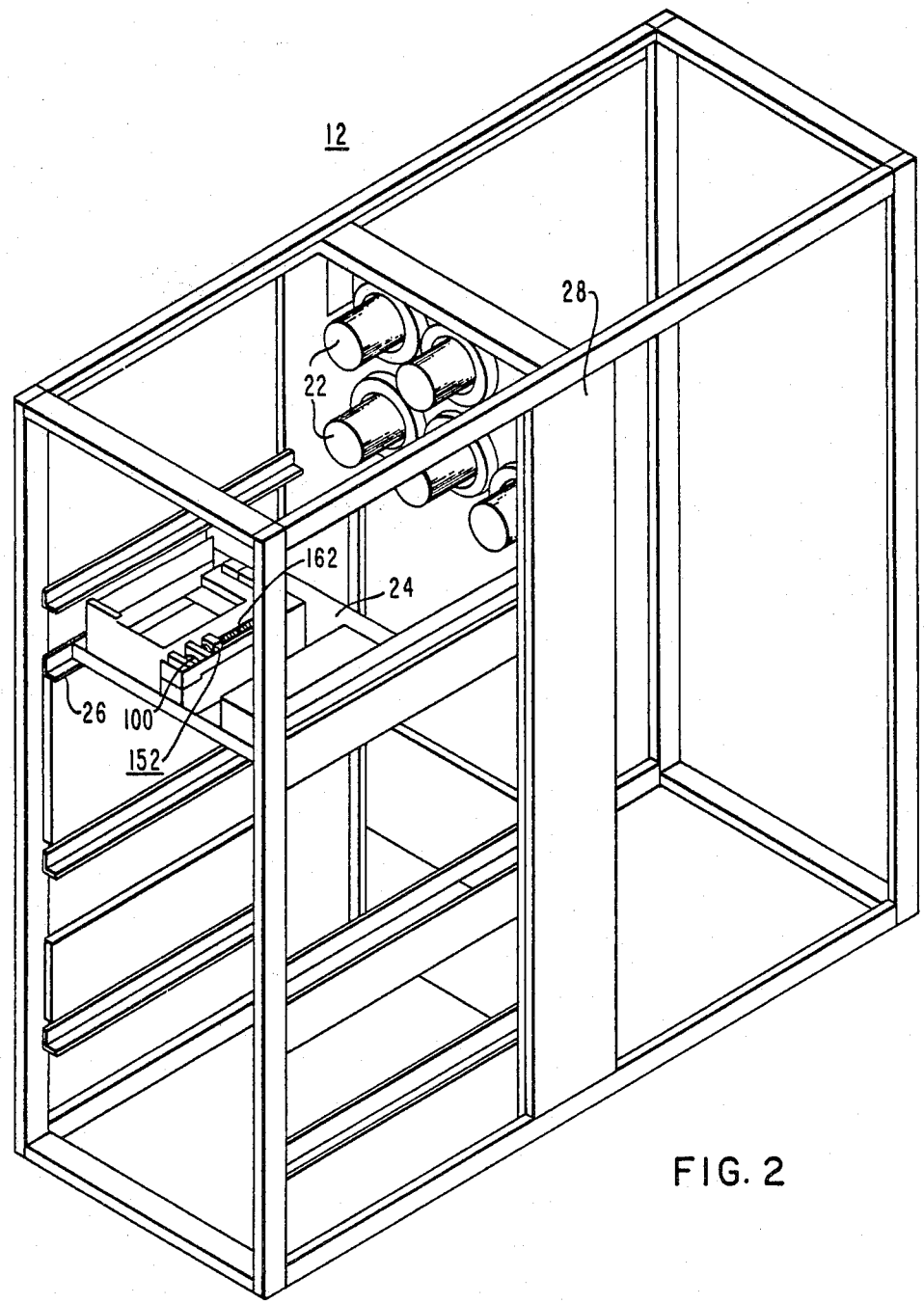
FIG. 2 is an orthogonal front and side view of the switchgear shown in FIG. 1 with side panels and drawout breaker units deleted to illustrate the drive means for moving the drawout units between the engaged and disengaged positions.

Referring now to FIG. 2, there is shown position operated clutch 100 and drive means 152 for moving the drawout unit 16 between the engaged position within the cabinet and the disengaged position rolled out on support rails such as support rails 20 shown in FIG. 1. Position operated clutch 100 and drive means 152 are disposed in equipment pan 24 which is attached to pan rails 26 within framework 28 of switchgear enclosure 12.

Referring now to FIGS. 3, 4 and 5, there are shown assembly drawings of the clutch body and the clutch drive collar portions of the position operated clutch 100 shown in FIG. 2 constructed according to the teachings of the invention. Clutch body 40 includes inside portion 42 and two symmetrical outside portions 44, which portions are rigidly secured together by two spring pins 46. Inside clutch body portion 44 includes clutch drive aperture 50 wherein there is disposed clutch drive collar 52 prior to securing the three portions of clutch body 40 with spring pins 46. Outside clutch body portions 44 each have keeper channels 54 disposed on the outer face thereof and all three clutch body portions as well as assembled clutch body 40 have disposed therein first and second keyways 56 and 58, respectively. Clutch drive collar 52 has first and second drive slots 62 and 64, respectively, disposed in opposite faces, respectively, of clutch drive collar 52. Clutch drive collar 52 further includes driving pin receptacles 66 disposed in one of the opposite faces of clutch drive collar 52.

Referring now to FIG. 6, there is shown an exploded assembly view of first and second shafts 70 and 80 respectively, which may be an input and output shaft, respectively, and their positions just prior to assembly with clutch body 40. First or input shaft 70 includes shaft stabilizing aperture 72, keeper receptacle 74 and female shaft socket 76 which may be a standard crank receptacle. Second or output shaft 80 includes shaft stabilizing projection 82, annular keeper groove 84, male shaft socket extension 86 and clutch drive collar securing pin 88. Shaft stabilizing projection 82 is sized to snugly fit within shaft stabilizing aperture 72 so as to provide transverse stability while allowing the input and output shafts to rotate relative to one another when the clutch is not engaged. The shaft selected to be rigidly secure to drive collar 52 by means of drive collar securing pin 88, in this case, second or output shaft 80 as shown in FIG. 6, must be oriented relative to clutch body 40 so as to mate with the face of clutch drive collar 52 wherein the driving pin receptacles 66 are located. When this orientation is made, second or output shaft 80 may be inserted through clutch body 40 such that shaft stabilizing projection 82 is received within shaft stabilizing aperture 72 and clutch drive collar 52 will be both rigidly secured to output shaft 80 by means of drive collar securing pin 88 and freely rotatable within clutch drive aperture 50. After assembly of first and second shafts 70 and 80 respectively with clutch body 40 of clutch 100 is at the stage represented by the assembly views of FIGS. 7, 8 and 9.

Referring now to FIGS. 7, 8 and 9, there is shown first and second drive pawls 90 and 92 having first and second drive legs 98, respectively, inserted within first and second keyways 56 and 58, respectively, of clutch body 40. First and second drive pawls 90 and 92 are resiliently held in position in first and second keyways 56 and 58, respectively, by means of first and second drive pawl springs 94 and 96, respectively. Input and output shafts 70 and 80 are secured to clutch body 40 by means of first and second keepers 102 and 104 which are disposed within keeper channels 54 and secured by bolt and nut combinations 106. First and second drive pawl springs 94 and 96, respectively, are also secured by bolt and nut combination 106. Keeper 102 rigidly secures input shaft 70 to clutch body 40 since keeper 102 snugly fits within keeper receptacle 74 on input shaft 70 so as to rigidly secure input shaft 70 to clutch body 40. Keeper 104 is disposed within annular keeper groove 84 on output shaft 80 so as to allow rotation of output shaft 80 relative to clutch body 40. Clutch body 40 and first and second or input and output shafts 70 and 80, respectively, are all axially secured to each other by means of keepers 102 and 104.

Referring now to FIG. 10, there is shown an elevational view of clutch 100 including all of the previously-described assemblies of FIGS. 3 through 9 with the addition of cover assembly 110. Cover assembly 110 includes cover tube 112, end cap 114, actuating end cap 116, centering springs 118 and cover screws 120. Cover screws 120 pass through cover screw pilot holes 122 (shown in FIGS. 4, 5, 8 and 9) to concentrically locate and secure cover assembly 110 about clutch body 40, and centering springs 118 bias cover assembly 110 in the axial direction such that end caps 114 and 116, respectively, are closely adjacent and equidistant from first and second drive pawls 90 and 92, respectively.

Figure 12:
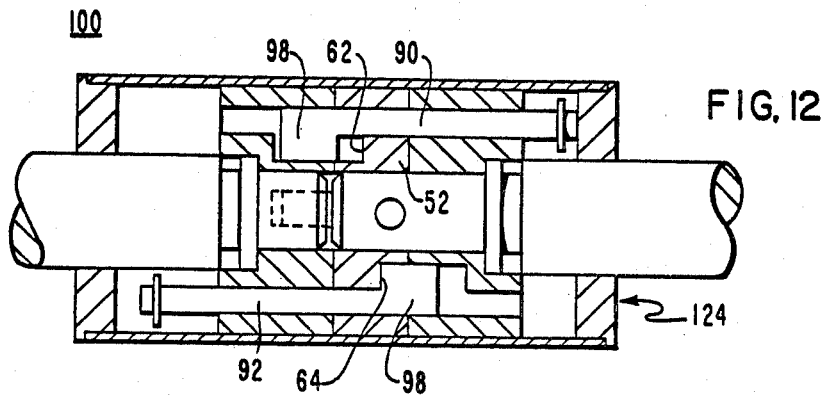
FIG. 12 is a cross sectional schematic view of a clutch according to the teachings of the invention illustrating the parts coupled to the input and output shafts and the relationship of the drive pawls to the coupled parts when the first drive pawl is disengaged.
Figure 11:
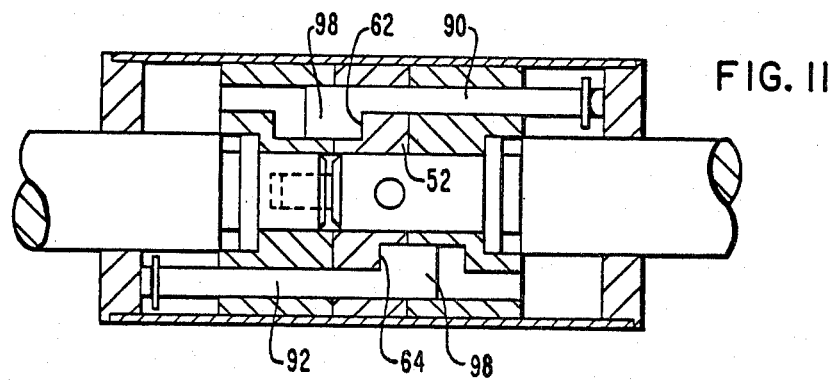
FIG. 11 is a cross sectional schematic view of a clutch according to the teachings of the invention illustrating the parts coupled to the input and output shafts and the relationship of the drive pawls to the coupled parts when the drive pawls are engaged.
Figure 13:
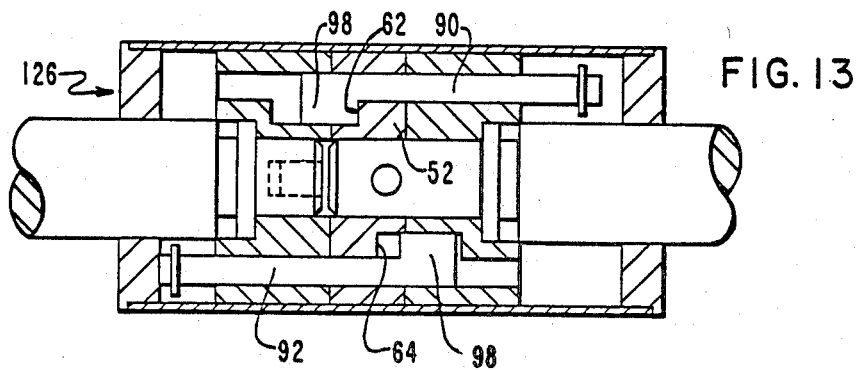
FIG. 13 is a cross sectional schematic view of a clutch according to the teachings of the invention illustrating the parts coupled to the input and output shafts and the relationship of the drive pawls to the coupled parts when the second drive pawl is disengaged.

Referring now to FIG. 11, there is shown a cross-sectional schematic view of clutch 100 constructed according to the teachings of the invention illustrating the clutch parts that are coupled to the input and output shafts and the relationship of the drive pawls to the coupled parts when the drive pawls are engaged. When the drive pawls are engaged, first drive pawl 90 and second drive pawl 92 are disposed relative to clutch drive collar 52 so as to be within and rigidly engaged with first and second drive slots 62 and 64, respectively, of clutch drive collar 52. This is the normal engaged position of clutch 100 when cover assembly 110 is biased by centering springs 118 to the normal equidistant position closely adjacent the first and second drive pawls. Clutch 100 becomes disengaged in either direction of rotation in response to an actuating force on cover assembly 110 which urges one of the drive pawls out of engagement with clutch drive collar 52. FIG. 12 represents clutch 100 in one of these disengaged positions, in response to an actuator force disposed on cover assembly 110 at a predetermined direction shown generally at 124. Cover assembly 110 urges first drive pawl 90 out of engagement with first drive slot 62 of clutch drive collar 52. Likewise, FIG. 13 represents clutch 100 in the other disengaged position, in response to an actuator force disposed on cover assembly 110 in the opposite direction shown generally at 126. Cover assembly 110 urges second drive pawl 92 out of engagement with second drive slot 64 of clutch drive collar 52. In the disengaged positions clutch 100 will slip in predetermined directions depending upon design of first and second drive slots 62 and 64 respectively.

The manner in which the construction of the first and second drive slots determines directions of engagement and disengagement of clutch 100 is presented most clearly by reference to FIG. 14 wherein there is shown an orthogonal view of the clutch drive collar 52 and the first and second drive pawls 90 and 92 respectively, to illustrate the relationship between the drive pawls and the drive collar in both the engaged and the disengaged positions. First and second drive slots 62 and 64 of clutch drive collar 52 include first and second transverse sides 140 and 142 and first and second perpendicular sides 144 and 146 respectively. Drive collar 52 and first and second drive pawls 90 and 92, respectively, are shown in the engaged position the same as they are shown in FIG. 11. First and second drive pawls 90 and 92 are also drawn in phantom in the disengaged position corresponding to their position in FIGS. 12 and 13 respectively. First drive pawl 90 is drawn in phantom at 132 to represent the positioning of first drive pawl 90 such as is illustrated in FIG. 12 when actuator force 124 acts upon cover assembly 110 so as to urge first drive pawl 90 to the disengaged position. Similarly, the second drive pawl 92 is shown drawn in phantom at 134 to represent second drive pawl 92 at the disengaged position such as is shown in FIG. 13 in response to actuator force 126 acting upon cover assembly 110 so as to urge second drive pawl 92 to the disengaged position. When second drive pawl 92 is in the disengaged position as drawn in phantom at 134, clutch drive collar 52 is free to rotate in the clockwise direction independently of clutch body 40 since first transverse side 140 of first drive slot 62 urges first drive pawl 90 out of first drive slot 62 into the disengaged position. Similarly, when first drive pawl 90 is in the disengaged position, drawn in phantom at 132, clutch drive collar 52 rotates independently of clutch body 40 in the counterclockwise position since second transverse side 142 of second drive slot 64 urges second drive pawl 92 out of second drive slot 64 into the disengaged position. When first and second drive pawls 90 and 92 are in the engaged positions, first and second perpendicular sides 144 and 146 respectively of first and second drive slots 62 and 64, respectively, engage with the first and second drive pawls 90 and 92, respectively, such that clutch drive collar 52 is rotatably engaged with clutch body 40 so as to rotate in unison in both the clockwise and counterclockwise directions. From this, it can be seen that by using one clutch pawl and one drive slot, for example first clutch pawl 90 and first drive slot 62, a single position actuated drive clutch may be constructed and the disengaged position may be selected to correspond to either the clockwise or counterclockwise direction of rotation by means of the orientation of the perpendicular and the transverse sides, for example perpendicular side 144 and transverse side 140 respectively, of the drive slot. When two drive pawls and two drive slots are utilized as described in FIGS. 11 through 14, a two position actuated drive clutch results and by designing the drive slots so as to have opposite orientations of the transverse sides, disengaged positions may then be provided for in both the clockwise and the counterclockwise directions of rotation.

Referring now to FIG. 15, there is shown a schematic view of position actuated clutch 100 in combination with a torque source shown generally at 150, drive means 152, and position sensing means 154 positively positioning a drawout unit shown generally at 156 in either the engaged or the disengaged positions. Torque source 150 may be a hand-crank or an electric motor, and is connected to position actuated clutch 100 by means of male shaft extension 160 being rigidly engaged with female shaft socket 76 by means of pin 168. Drive means 152 may be a drive screw such as drive screw 162 which extends through and is threadedly engaged with a drawout unit actuator such as actuator 164 which is provided internally with screw threads. Drawout unit actuator 164 is connected to a drawout unit such as the drawout unit shown generally at 156 by means of levering in arm 158. Levering in arm 158 may be disengaged from drawout unit actuator 164 when it is desired to completely remove the drawout unit such as drawout unit 156 from the switchgear station. Drive means 152 is connected to position actuated clutch 100 by means of female shaft socket 166 being rigidly engaged with male shaft extension 86 by means of pin 168. In this way, if position actuated clutch 100 should fail, clutch 100 may be removed from the drive apparatus and torque source male shaft extension 160 including pin 168 may be inserted directly into drive screw female shaft socket 166 and the drawout unit would still be capable of being operated between the engaged and disengaged positions by the manual "bottomed out" method. Position sensing means 154 includes positioning shaft 170 having rigid engaged and disengaged position stops 172 and 174, respectively, which is rigidly connected to yoke 176 which in turn mates with complementary actuating end cap 116. Thus, position sensing means 154 acts upon cover assembly 110 as the actuator forces shown generally at 124 and 126 in FIGS. 12 and 13 respectively.

In operation, drive means 152 moves drawout unit 156 to the engaged position by means of drive screw 162 rotating, for example, in the clockwise direction, until drawout unit actuator 164 collides with engaged position stop 172 thereby actuating cover assembly 110 by means of positioning shafts 170, yoke 176 and actuating end cap 116. Cover assembly 110 in turn urges, for example, first drive pawl 90 out of engagement with clutch drive collar 52 wherein position actuated clutch 100 now disengages torque source 150 with drive means 152 and torque source 150 spins freely in the clockwise direction until the operator deenergizes it. In like manner, drawout unit 156 is moved to the disengaged position by means of drive screw 162 rotating, for example, in the counterclockwise direction, until drive unit actuator 164 collides with disengaged position stop 174 thereby actuating cover assembly 110 by means of positioning shaft 170, yoke 176 and actuating end cap 116. Cover assembly 110 in turn urges, for example, second drive pawl 92 out of engagement with clutch drive collar 52 wherein position actuating clutch 100 now disengages torque source 150 with drive means 152, and torque source 150 spins freely, for example, in the counterclockwise direction until the operator deenergizes it.

In conclusion, what has been disclosed is a position actuated drive clutch for selectively engaging and disengaging a torque source with a drive means according to predetermined positions of a driven load. The drive means may be a drive screw which converts rotation to linear motion to drive the load. When the load reaches a predetermined position the clutch disengages, separating the torque source from the drive means. Upon reversing rotation of the torque source the position actuated drive clutch according to the teachings of the invention engages and the drive means drives the load in the opposite direction. Single position and two predetermined positioned embodiments are possible according to the teachings of the invention. Although the preferred embodiments of the invention described herein were developed in order to solve certain problems within switchgear apparatus, the invention is not limited to such switchgear applications but rather is broadly applicable to any apparatus wherein a rotational drive apparatus such as a linear drive screw is desired to have disengagement as a function of position rather than as a function of torque limit, i.e., such as a friction clutch of the prior art. The disengagement of the position actuated clutch according to the teachings of the invention is automatically controlled due to physical actuation of the cover assembly according to linear motion of the output load. The two-way position actuated drive clutch embodiment of the invention provides for engagement in both directions of rotation and always drives in at least one direction of rotation.

We claim:

1. A clutch, comprising:
    an input shaft adapted for connection to a torque source;
    an output shaft adapted for connection to a load;
    a clutch body having first and second keyways disposed therein, said clutch body being rigidly connected to said input shaft;
    a drive collar rigidly attached to said output shaft;
    first and second clutch pawls disposed within said first and second keyways, respectively; and
    engagement means for selectively engaging and disengaging each of said first and second clutch pawls with said drive collar to selectively provide and remove a rigid connection between said clutch body and drive collar to selectively transmit and interrupt torque from said input shaft to said output shaft.

2. A position activated clutch, comprising:
    a sensing means for sensing the position of a load;
    an input shaft adapted for connection to a torque source;
    an output shaft adapted for connection to a load;
    a clutch body having first and second keyways disposed therein, said clutch body being rigidly connected to one of said input and output shafts;
    a drive collar rigidly attached to the other of said input and output shafts;
    first and second clutch pawls disposed within said first and second keyways, respectively; and
    engagement means responsive to said sensing means for selectively engaging and disengaging each of said first and second clutch pawls with said drive collar to selectively provide and remove a rigid connection between said clutch body and said drive collar to selectively transmit and interrupt torque from said input shaft to said output shaft in either direction of rotation.

3. Switchgear, comprising:
    a cabinet having line terminals;
    a movable circuit breaker assembly having complementary terminals with said line terminals and adapted for insertion and removal from said line terminals;
    drive means having a rotatable shaft for moving said circuit breaker into and out of said cabinet, said rotatable shaft being adapted for connection to a torque source for rotating said shaft;
    a position activated clutch adapted for insertion between said torque source and said rotatable shaft for selectively engaging and disengaging said torque source with said rotatable shaft, said clutch including an input shaft adapted for connection to said torque source and an output shaft adapted for connection to said rotatable shaft, a clutch body having first and second keyways disposed therein, said clutch body being rigidly connected to one of said input and output shafts, a drive collar rigidly attached to the other of said input and output shafts, first and second clutch pawls disposed within said first and second keyways, respectively, sensing means for sensing the position of said circuit breaker assembly, and engagement means responsive to said sensing means for selectively engaging and disengaging each of said first and second clutch pawls with said drive collar to selectively provide and remove a rigid connection between said clutch body and said drive collar to selectively transmit and interrupt torque from said input shaft to said output shaft in either direction of rotation.

4. The position activated clutch of claim 2, wherein said drive collar has first and second drive slots, said slots each having a first side positioned parallel to a radii of said drive collar and a second side positioned transversed to a radii of said drive collar;
    said first and second clutch pawls having first and second drive dogs extending beyond said first and second keyways, respectively, juxtapositioned with the rotational path of said first and second drive slots, respectively; and
    said engagement means includes pawl positioning means for selectively positioning said first and second clutch pawls such that said first and second drive dogs are inserted within said first and second drive slots, respectively, each of said drive dogs rigidly engaging said first side of said drive slots to transmit torque in a predetermined direction, and each of said drive dogs being ratcheted out of said drive slot by said second side of said drive slot to interrupt the transmission of torque in the opposite direction of rotation.

5. The position actuated clutch of claim 4 wherein said pawl positioning means includes biasing means for moving said clutch pawls to position said drive dogs within said drive slots of said drive collar, and a cylindrical cover tube independently rotatably mounted on said input and output shafts to provide for axial communication with said clutch pawls to provide for a means for moving said clutch pawls in the opposite direction.

6. The position actuated clutch of claim 5 wherein said cylindrical cover tube is in communication with and responsive to said load position sensing means for moving said clutch pawls in the direction necessary to move said drive dogs out of said drive slots when said load position sensing means senses the maximum predetermined distance a movable circuit breaker assembly should travel in each direction.

7. The position activated clutch of claim 1, wherein said drive collar has first and second drive slots, said slots each having a first side positioned parallel to a radii of said drive collar and a second side positioned transversed to a radii of said drive collar;

said first and second clutch pawls having first and second drive dogs extending beyond said first and second keyways, respectively, juxtapositioned with the rotational path of said first and second drive slots, respectively; and said engagement means includes pawl positioning means for selectively positioning said first and second clutch pawls such that said first and second drive dogs are inserted within said first and second drive slots, respectively, each of said drive dogs rigidly engaging said first side of said drive slots to transmit torque in a predetermined direction, and each of said drive dogs being ratcheted out of said drive slot by said second side of said drive slot to interrupt the transmission of torque in the opposite direction of rotation.

8. The position actuated clutch of claim 7 wherein said pawl positioning means includes biasing means for moving said clutch pawls to position said drive dogs within said drive slots of said drive collar, and a cylindrical cover tube independently rotatably mounted on said input and output shafts to provide for axial communication with said clutch pawls to provide for a means for moving said clutch pawls in the opposite direction.

9. The position actuated clutch of claim 8 further including a load position sensing means, and wherein said cylindrical cover tube is in communication with and responsive to said load position sensing means for moving said clutch pawls in the direction necessary to move said drive dogs out of said drive slots when said load position sensing means senses the maximum predetermined distance a movable circuit breaker assembly should travel in each direction.

10. The switchgear of claim 3, wherein said drive collar has first and second drive slots, said slots each having a first side positioned parallel to a radii of said drive collar and a second side positioned transverse to a radii of said drive collar;

said first and second clutch pawls having first and second drive dogs extending beyond said first and second keyways, respectively, juxtapositioned with the rotational path of said first and second drive slots, respectively; and said engagement means includes pawl positioning means for selectively positioning said first and second clutch pawls such that said first and second drive dogs are inserted within said first and second drive slots, respectively, each of said drive dogs rigidly engaging said first side of said drive slots to transmit torque in a predetermined direction, and each of said drive dogs being ratcheted out of said drive slot by said second side of said drive slot to interrupt the transmission of torque in the opposite direction of rotation.

11. The switchgear of claim 10 wherein said pawl positioning means includes biasing means for moving said clutch pawls to position said drive dogs within said drive slots of said drive collar, and a cylindrical cover tube independently rotatably mounted on said input and output shafts to provide for axial communication with said clutch pawls to provide for a means for moving said clutch pawls in the opposite direction.

12. The switchgear of claim 11 further including a load position sensing means, and wherein said cylindrical cover tube is in communication with and responsive to said load position sensing means to provide for moving said clutch pawls in the direction necessary to move said drive dogs out of said drive slots when said load position sensing means senses the maximum predetermined distance said movable circuit breaker assembly should travel in each direction.

13. A position actuated clutch, comprising:
an input shaft adapted for connection to a torque source;
an output shaft adapted for connection to a load;
a clutch body having a keyway disposed therein, said clutch body being rigidly connected to one of said input and output shafts;
a drive collar rigidly attached to the other of said input and output shafts;
a clutch pawl disposed within said keyway; and
engagement means for selectively engaging and disengaging said clutch pawl with said drive collar to selectively provide and remove a rigid connection between said clutch body and said drive collar to as to selectively transmit and interrupt torque from said input shaft to said output shaft.

14. A clutch, comprising:
a first shaft;
a second shaft;
a clutch body, said clutch body being rigidly connected to said first shaft;
a drive collar rigidly attached to said second shaft;
first and second clutch pawls disposed on said clutch body; and
engagement means for selectively engaging each of said first and second clutch pawls with said collar to selectively provide and remove a rigid connection between said clutch body and said drive collar to selectively transmit and interrupt torque between said first shaft and said second shaft.

15. A clutch, comprising:
a first shaft;
a second shaft;
a clutch body, said clutch body being rigidly connected to said first shaft;

a drive collar rigidly attached to said second shaft;
first and second clutch pawls disposed on said collar; and
engagement means for selectively engaging and disengaging each of said first and second clutch pawls with said clutch body to selectively provide and remove a rigid connection between said clutch body and said drive collar to selectively transmit and interrupt torque between said first shaft and said second shaft.

* * * * *